United States Patent [19]
Johnson

[11] 3,719,376
[45] March 6, 1973

[54] EXPANSION DEVICE FOR MOUNTING AN UPRIGHT COLUMN TO A BASE STRUCTURE

[76] Inventor: Jacob L. Johnson, 7518 Piney Branch Road, Silver Spring, Md. 20910

[22] Filed: March 22, 1971

[21] Appl. No.: 126,857

[52] U.S. Cl................287/20.3, 287/124
[51] Int. Cl..............................B25g 3/28
[58] Field of Search.......287/124, 20.3, 2; 85/67, 87, 85/73, 72; 279/2

[56] References Cited

UNITED STATES PATENTS

| | | | |
|---|---|---|---|
| 3,404,504 | 10/1968 | Taylor | 85/67 |
| 1,225,795 | 5/1917 | Fraser | 287/20.3 X |
| 1,461,767 | 7/1923 | Weyrauch | 85/67 X |
| 1,953,636 | 4/1934 | Skelton | 85/67 X |
| 3,303,736 | 2/1967 | Raynovich, Jr. | 85/87 X |

FOREIGN PATENTS OR APPLICATIONS

| | | | |
|---|---|---|---|
| 885,265 | 12/1961 | Great Britain | 287/20.3 |

Primary Examiner—Andrew V. Kundrat
Attorney—Cushman, Darby & Cushman

[57] ABSTRACT

An improved device for rigidly mounting a hollow column to a base structure is provided. The device comprises a plurality of expansion members which when arranged end to end form a block which is telescopically accepted into the end of the hollow column, the block has a central bore with tapered walls, a tapered wedge member is force by appropriate means into the central bore forcing the expansion members radially outward and against the column wall. The column wall is forced by the expanding members into rigid contact with the base.

2 Claims, 13 Drawing Figures

PATENTED MAR 6 1973 3,719,376

EXPANSION DEVICE FOR MOUNTING AN UPRIGHT COLUMN TO A BASE STRUCTURE

BACKGROUND AND BRIEF DESCRIPTION OF INVENTION

The present invention relates in general to a connecting device for releasably securing one article within another and, more particularly, to a connecting device for securing an upright column to a base structure. The device is particularly useful for mounting to a base member an upright column member upon which shelf supporting brackets can be mounted. The column members and base members can be quickly assembled by means of the novel connecting device to provide an unusually strong and rigid, free-standing structure wherein the column members have vastly improved resistance supported so to vertical deflection in all directions.

In prefabricated free-standing shelving of the type used in libraries, for example, the column members must be supported by a base member which provides necessary lateral stability to prevent vertical deflection of the column under the load applied by the weight of the shelving and books or other material stored on the shelving. From a practical standpoint, such shelving apparatus must be formed from separate components so that it can be broken down and shipped conveniently and then assembled easily at the place of use.

Generally speaking, previous attempts to develop this type of shelf structure have involved some type of wedging action utilizing sliding members which are wedged between the column and the base, holding the column in position on the base. A typical device of this type is described in U. S. Pat. No. 3,009,581, wherein a shelving structure is disclosed comprising upright, hollow standards or columns upon which shelf brackets on the base member of the column can be mounted by means of connecting device consisting of a pair of similar wedge members. The first wedge member is rigidly secured to and within the lower end of each shelf standard or base and the second wedge member is adjustably supported upon the first. The two wedge members have engageable surfaces which are similarly sloped with respect to their lengthwise extents. Said wedge members are connected by screw means so that, parts of both can be inserted into the upper end of said upright post when said sloped surfaces are adjacent each other. The wedge members are then moved by said screw means in a lengthwise direction toward each other so that their sloped surfaces cause them to move laterally away from each other and thereby wedge themselves within the post. This connecting device has two unfortunate disadvantages. First, the upper wedge piece must be secured to the column member as by spot welding and thus must be done prior to the arrangement of the shelving at the construction site. Secondly, the wedging action is directed in two directions only and the column is secured to the base at two positions and thus the column can pivot about an axis through the two points where the column is secured to the base. The column can be pivoted about this axis when rather small forces are applied to the column which tend to put rotational forces on the column about this axis. A small pivot motion results in rather large vertical deflection of the column.

Another type of wedging action is demonstrated in the U. S. Pat. No. 3,127,020, wherein the column itself has two walls which are tapered on their inside such as to approach each other. A wedged shaped member is drawn between the column walls by a screw mechanism forcing the column walls to deflect and expand in the direction of the two tapered walls. These walls are thus forced into rigid contact with a base member which surrounds the column member. This device is also plagued with the two disadvantages mentioned earlier with respect to the device of U.S. Pat. No. 3,009,581. The column ends have particular shapes which must be formed during the manufacture of the column and prior to the arrangement of the shelving at the construction site. In addition, the column again is held y a wedging action which secures the column to the base at only two positions again allowing the column to pivot about an axis through the two points of attachment of the column to the base.

An improved so-called universal base, connecting device is available in commerce which permits the use of a base support member which is formed so as to accept a hollow column coaxially. The connecting device comprises two members having tapered sides which face each other and a third member in the form of a tapered wedge which is situated between the tapered sides of the other two members. The tapered wedge copperates with the other two members to move the two other members apart in a direction transverse to the movement of the tapered wedge. In use, the column is inserted in the base and the connecting device is inserted within the column. The tapered wedge is drawn down to force the other two members of the connecting device into contact with opposite sides of the column. The column end is deflected in the direction of the expansion of the connection device and held in rigid contact with the surrounding base member. This device has the advantage that ordinary base members and columns can be assembled at the construction site. Neither the base members nor the column members require special shaping or attaching of devices prior to the actual construction of the shelving. However, this device does have the disadvantage, as explained hereinbefore, with respect to the other prior art connecting devices. The device has only one degree of expansion. The movement of the two expansion members is in a straight line with the expansion members moving from each other in opposite directions. The column can pivot about an axis along the line of the expansion of the connecting device. In addition, this device is awkward to handle during the construction of the shelving, as the base, column and the three members of the connecting device must be held together in a tedious operation during the assembly while expanding the connecting device sufficiently to hold the parts as an integral unit.

An object of the present invention is to provide a connecting device which can be used with standard base and column members and which expands in a plurality of directions to securely fix each side of the column members with respect to the corresponding side of the base member, and thus, preventing the column from any pivotal movement.

Another object of the present invention is to provide an expansion type connecting device wherein the device is held together in a single unit prior to expansion, thus being much easier handled during erection of the column and base support member.

These and other objects and purposes of this invention, which will become apparent to persons familiar with this type of structure upon reading the following descriptive material and examining the accompanying drawings, are achieved by providing a connecting device comprising a plurality of expansion members, which when arranged side-by-side, form a block having a central opening therethrough from top to bottom. The opening has tapering side walls whereby the opening continuously diminishes in size from the top of the block to the bottom. The connecting device also comprises a wedge member having approximately the same shape and size as the opening in the block. Means are provided for forcing the wedge member downward through the opening in the block and thereby forcing the expansion members outward in a radial direction from the longitudinal axis through the wedge member. The expansion members contact the column member and deflect the side walls of the column member into forced contact with the walls of the support base. Because the plurality of expansion members move radially, equally spaced from each other, the column walls are uniformly forced into contact with the base support and there is no pivot axis about which the column can move within the base support. The column is thus secured more firmly to the base support and has a much improved resistance to deflection in comparison to columns attached to the base support by the connectors of the prior art.

Conventionally, the columns used in free-standing shelving structures are square or rectangular and the base unit has an opening of equal shape in which the end of the column is slidably received. In such applications, the connecting device of the present invention if formed of four expansion members which when placed end to end form a square or rectangularly shaped block having a central opening therethrough from top to bottom which tapers or continuously gets smaller from the top to the bottom. An elongated wedge member of circular cross section is forced by appropriate means into the opening of the square or rectangularly shaped block thereby forcing the individual expansion members of the block outwardly in a radial direction from the longitudinal axis of the opening in the block. Each expansion member contacts one sidewall of the rectangularly shaped column and forces the column sidewall into rigid contact with the base or supporting member. The column is thus held securely in place by four equally spaced points of attachment. The column cannot pivot within the base structure about any axis as the 4 way contact prevents any pivotal motion. The column is thus prevented from deflecting in any direction, thus greatly increasing the structural strength of the assembled shelving.

Columns having any cross-sectional shape can be rigidly attached to a base member with a suitably shaped connecting device according to this invention. The connecting devices of this invention can be shaped to accommodate columns having shapes including circular, triangular, oval or multisides, such as a pentagon. If the column is circular in cross-section, the expansion device according to the invention has at least three, and preferably 4, sections which expand out against the column wall. If there are three expansion members, they expand radially outward with the line of expansion of each member being separated from the other by 120°. Four or more expansion members can also be used with the circular columns. Each expansion member expands radially outward, with the expanding members equidistant from each other.

When the column is multisided, such as triangular, pentagonal or hexagonal, the expansion device has an equal number of expansion members as there are sides to the column.

As mentioned hereinbefore, the expansion device is useful for connecting the columns of a free-standing shelving arrangement to the base member. In addition, the device is useful wherever a free-standing column is to be connected to a base member, e.g. single pedestal stools such as found at lunch counters and movable single pedestal signs such as school cross signs. The device of the present invention will secure any hollow, free-standing column to a base member which is arranged coaxially around the end of the column to be secured. The column is securely held to the base and held securely against pivotal movement in any direction in the base member.

DETAILED DESCRIPTION OF INVENTION

The invention will be more fully described by the following description with reference to the drawings in which.

Figure 1:
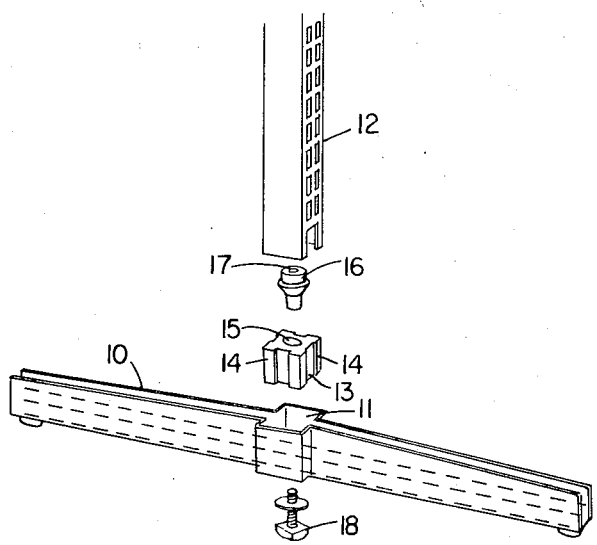
FIG. 1 is an exploded perspective of a base support and column assembly for a free-standing shelving structure showing one preferred embodiment of the connecting device of this invention.

Referring now to FIG. 1, there is shown in exploded perspective a standard base support and column section of a free-standing shelving construction. The base member 10 has an opening 11 into which a hollow column member 12 is slidable received. Positioned inside the column member 12, is a connecting device according to this invention. The connecting device comprises a block 13 of four expansion members 14 and a central opening 15. The central opening 15 has tapered sides with the opening gradually getting smaller from the top of the block to the bottom. A tapered wedge member 16 having the general shape and size of the opening 15 of block 13 has a central bore 17 which is threaded to receive bolt 18. Bolt 18 extends through opening 15 of block 13. By turning bolt 18, the wedge member 16 is forced down into opening 15 and in turn forces expansion members 14 radially outward toward the walls of column 12. The expansion members 14 force the walls of column 12 into forced engagement with the side walls of the opening 11 of base support 10. All four sides of column 12 are held tightly between one of the expansion members and the side wall of the opening 11 of base member 10. The column 12 cannot pivot about any axis and thus is resistant to vertical deflection in any direction.

Figure 2:
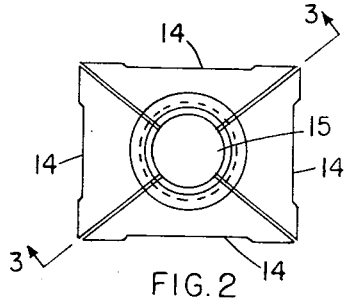
FIG. 2 is a top view of the connecting device of FIG. 1.
Figure 3:
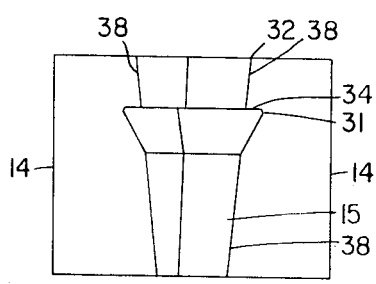
FIG. 3 is a cross-sectional view of the connecting device of FIG. 2 taken along line 3—3.

The block 13 of FIG. 1 is shown in FIGS. 2 and 3. As can be seen in FIG. 2, the four expansion members 14 which when placed end to end form the block 13 having a central opening 15 which is tapered so as to continuously get smaller from the top of the block to the bottom. The tapered shape of the opening 15 is better shown in FIG. 3.

Figure 4:
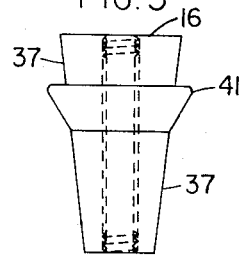
FIG. 4 is a side view of the wedge member of the connecting device of FIG. 1.

One preferred embodiment of the connecting device of this invention is shown in FIGS. 1 through 5. In this embodiment, the opening 15 of the block 13 has a notched section 31 positioned between the top and the bottom of the block 13. The tapered wedge member 16, as shown in FIG. 4, has a notched section 41 which corresponds to the notched section 31 in block 13. When the block 13 and wedge 16 are assembled, the notches 41 and 31 intermesh, thereby holding the wedge member 16 in the block 13.

Preferably, the taper of the opening 15 and wedge 16 have the same slope. In the block 13 of FIG. 3, the opening 15 tapers from its greatest size 32 at the top of the block to point 33 corresponding to the smallest size of the opening 15. Notch 31 is cut into the block 13 so that its upper face 34 is parallel to the ends of the block 13 and such that the maximum diameter of the notch 31 is at least as great as the diameter of opening 15 at its greatest size 32 at the top of block 13. The side wall 40 from notch 31 to the bottom of block 13 has the same taper as side wall 38 of opening 15. The wedge member 16 has a tapered face 37 having the same slope as the taper of opening 15. At some point intermediate in the length of wedge member 16, the diameter of the wedge is increased as shown at reference number 41. The diameter at 41 equals the diameter the notch 31 of bore 15 in block 13. In the connecting device, as shown in FIGS. 3 and 4, the wedge member 16 is forced by appropriate means to move downward in the bore 15 of block 13 and the face 37 of the wedge member contacts face 38 of the expansion members respectively and force the expansion members outward uniformly in a radial direction from the longitudinal axis of the bore 15.

Figure 13:
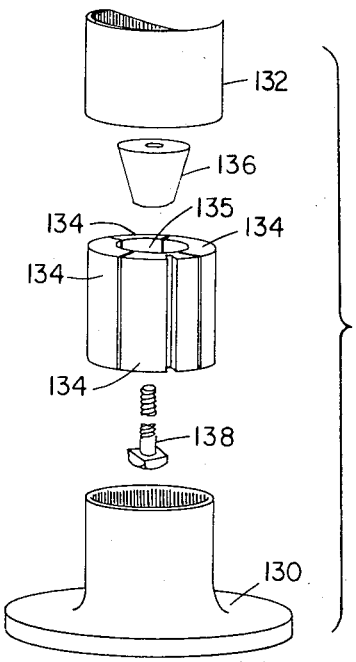
FIG. 13 is a perspective of a circular column and base assembly utilizing a connecting device according to the present invention.

The embodiment shown in FIGS. 3 and 4 has the distinct advantage that the wedge member is held in block 13. If during the tightening of the bolt 138, as shown in FIG. 13, to force the wedge member 136 which does not have the notched sidewall as shown in FIGS. 3 and 4, into the bore 135 of block 106, the bolt happens to break, the wedge member 136 has a tendency to pop out of the block. If the same happens using the device of FIGS. 3 and 4, the notch 31 of block 13 and protrusion 41 of the wedge member 16 engage each other and prevent the wedge from leaving the block assembly.

Figure 5:
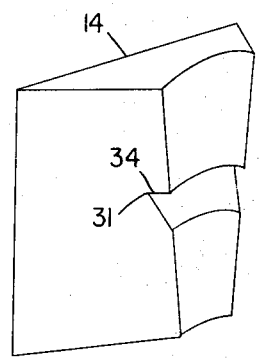
FIG. 5 is a perspective of one of the expanding members of the connecting device shown in FIG. 1.

FIG. 5 shows an individual expansion member 14 of the connecting device shown in FIGS. 2 and 3. As can be seen, each member is of a shape which can easily be cast or machined. All four of the expansion members of the device shown in FIGS. 2 and 3 are identical in shape. Thus, only one casting mold is needed to produce the expansion members of any one embodiment of a device according to this invention.

Figure 9:
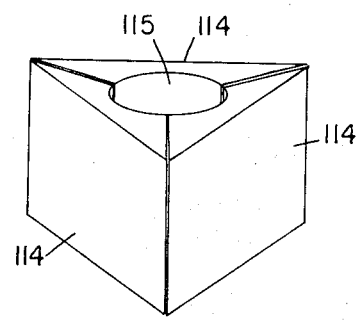
FIG. 9 is a perspective view of the expanding elements of a triangular shaped connecting device.
Figure 8:
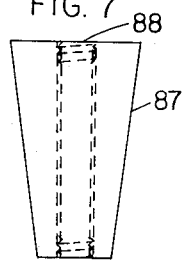
FIG. 8 is a side view of the wedge member for the connecting device shown in FIG. 6.

The connecting device need not be square. A triangular shaped connecting device is shown in FIG. 9 formed from three identical expansion members 114. The triangular shaped device has a central bore 115 which tapers or continuously gets smaller from the top of the device to the bottom. A circular wedge member like that shown in FIGS. 4 or 8 is inserted and forced downward by appropriate means through the central bore 115 thus forcing the three expansion members outward radially from the axis through the central bore 115. The column used with the device of FIG. 9 would have a triangular shape and each expansion member would expand outward against one of the sides of the column.

Figure 6:
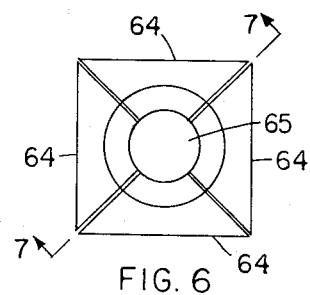
FIG. 6 is a top view of the expanding members of another preferred embodiment of a connecting device according to the present invention.
Figure 7:
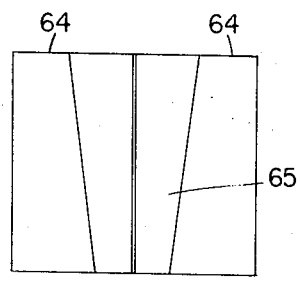
FIG. 7 is a cross-sectional view of the expanding members of FIG. 6 taken along line 7—7.

An alternate form of the device of FIGS. 3 and 4 is shown in FIGS. 6, 7 and 8 wherein the central bore 65 has a continuous taper with no notch. The device is formed by expansion members 64 similar to the device shown in FIGS. 2 and 3. The wedge member used with the device of FIG. 6 and 7 is shown in FIG. 8. It has continuously tapered sides 87. The wedge member has a central bore 88 which is threaded as the wedge member shown in FIG. 4.

Figure 12:
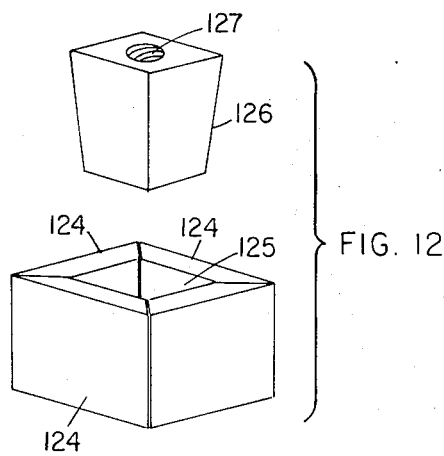
FIG. 12 is a perspective of a rectangular shaped connecting device having a square shaped wedge member.

In all the above described devices, the wedge member is circular in cross section; however, it can also have a shape similar to the block in which it is to be used. Thus, in FIG. 12 there is shown a square expansion block 123 formed from four equally shaped expansion members 124. Instead of a central bore, the block 123 has a central opening 125 having the shape of a square. The inward facing side of each member 124, which form the opening 125, tapers so that the square opening 125 formed by the four members 124 gradually gets smaller from the top of the block 123 to the bottom. The wedge member 126 has a shape corresponding to the opening 125. The wedge 126 is square in cross section with the sides tapering such that the square continuously gets smaller from the top of the wedge to the bottom. The wedge 126 has a central bore 127 which is threaded internally for receiving a bolt (not shown) which extends through the opening 125 of block 123. Tightening the bolt will force the square wedge member down through the opening 125 and the expansion members 124 will, in turn, be forced outward radially from an axis through the center of opening 125.

Figure 11:
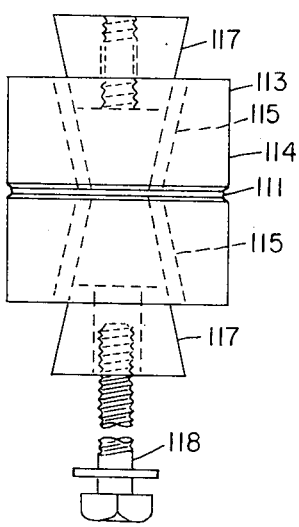
FIG. 11 is a side view of a further preferred embodiment of a connecting device according to the present invention utilizing two wedge members.

Another alternate form of connecting device according to the present invention is shown in FIG. 11 where two wedge members 117 are forced towards each other by bolt 118 which is threadably received by one of the wedge members. The bore 115 tapers from each end of the block so that the bore is smallest in diameter at the midpoint between the top and bottom of block 113 and continuously gets larger from the midpoint towards both ends. The block 113 in the embodiment shown in FIG. 8 comprises 4 expansion members 114 similar to the block 13 of FIGS. 2 and 3.

Another feature which can be employed with any of the connecting devices of this invention is shown in FIG. 11 wherein each expansion member has a groove 111 running parallel to and midway between the top and bottom faces of the expansion member. The groove 111 can be used to hold the assembled connecting device together as a single unit prior to installation in the column and base by wrapping a wire, elastic band, string or other similar object around the block 113 in groove 111.

Figure 10:
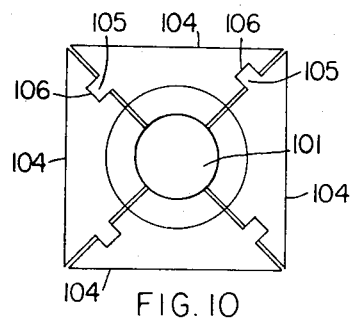
FIG. 10 is a top view of the expanding elements of a connecting device according to the present invention wherein the elements are shaped so as to be keyed to each other as a unitary member prior to being expanded by the wedge element.

An alternate method of holding the connecting device together prior to its installation in the column-base structure is shown in FIG. 10. The four expansion elements 104 of the square expansion device shown are keyed together by extensions 105 on one face of each of the expansion member. These extensions 105 run the full length of the side of each member 104. The opposite face of each expansion member has slots 106 running the full length of the side of each member. The slots 106 are similarly shaped to the extensions 105. The expansion members are put together by sliding the extension of one member into the slot of the other member. The extension 105 should be small enough or weak enough to be easily broken when the expansion wedge is forced into the tapered bore 101. The extensions 105 break and allow the expansion members to expand as hereinbefore described.

As mentioned hereinbefore, the expansion device of this invention can have a round shape and such a device is shown in FIG. 13, which shows a portable base 130 and circular column 132 being held together by a circular expansion according to the present invention. In the embodiment shown, the expansion device comprises 4 equally shaped expansion members 134. The device can be made of 3 or more equally shaped expansion members if desired. The bolt 138 engages the internal threads of wedge member 136. By turning bolt 138, the wedge 136 is forced downward in bore 135. The expansion members 134 are forced radially outward from the longitudinal axis through bore 135 and into contact with the walls of column 132. The walls of column 132 are deflected into rigid contact with the walls of the base member 130, thus rigidly connecting the column 132 to its base 130.

Obviously many modifications and variations of the present invention are possible in light of the above teachings. It is, therefore, to be understood that within the scope of the appended claims, the invention may be practiced otherwise than as specifically described.

What is claimed is:

1. A device for rigidly mounting a hollow column to a base support structure wherein said base support structure surrounds an end portion of said hollow column with said device being positioned in said end portion of said hollow column, said device comprising (a) a plurality of expansion members, each member having an exterior wall and an interior wall, said members being assembled in contact with each other around a common axis to form a block assembly and a central bore extending through said block assembly along said common axis, said central bore having a bore wall defined by the interior walls of said expansion members with the bore wall tapered in a direction to reduce its cross-section axially from one end of said bore toward the other, the exterior shape of said block assembly in a cross-section through said block transverse to said bore being similar to the interior shape of a cross-section axially through the end of said column, the interior wall of each expansion member having an elongated notch extending across the said interior wall transverse to said central bore, (b) a tapered wedge member telescopically receivable in the central bore and having an axial taper from one end of said wedge member to the other said axial taper being complementary to the bore wall taper, said wedge member being positioned in axial alignment with the central bore with the tapers of said wedge member and of said bore mating, the tapered wedge member having an extension corresponding in shape to the notch in said interior walls of said expansion members, said extension circumscribing said tapered wedge member and being transverse to the axis of said tapered wedge member whereby said notch and said extension engage each other to hold said tapered wedge in the bore of said block, and (c) means for forcing said tapered wedge member longitudinally through said central bore thereby forcing said expansion members of said block assembly to move radially away from the axis extending through the tapered wedge member whereby said expansion members expand against the walls of the column and force the walls of the column into firm, rigid support with said base structure.

2. A device for rigidly mounting a hollow column to a base support structure wherein said base support structure surrounds an end portion of said hollow column with said device being positioned in said end portion of said hollow column, said device comprising (a) at least three expansion members, each member having an exterior wall and an interior wall, said members being assembled around a common axis to form a block assembly and a central bore extending through said block assembly along said common axis, said central bore having a bore wall defined by the interior walls of said expansion members with the bore wall tapered in a direction to reduce its cross-section axially from one end of said bore toward the other, the exterior shape of said block assembly in a cross-section through said block transverse to said bore being similar to the interior shape of a cross-section axially through the end of said column, and means for holding said expansion members together as said block prior to being inserted into the column, said means comprising interlocking ribs and grooves on the mutually contacting walls of said expansion members, said ribs frictionally held in said grooves, (b) a tapered wedge member telescopically receivable in the central bore and having an axial taper from one end of said wedge member to the other said axial taper being complementary to the bore wall taper, said wedge member being positioned in axial alignment with the central bore with the tapers of said wedge member and of said bore mating, and (c) means for forcing said tapered wedge member longitudinally through said central bore thereby forcing said expansion members of said block assembly to move radially away from the axis extending through the tapered wedge member whereby said expansion members expand against the walls of the column and force the walls of the column into firm, rigid support with the said base structure and wherein said ribs are frangible so as to break when said expansion members are moved radially by said wedge.

* * * * *